US008840387B2

(12) United States Patent
Uoe et al.

(10) Patent No.: US 8,840,387 B2
(45) Date of Patent: Sep. 23, 2014

(54) SEALING DEVICE

(75) Inventors: Kousuke Uoe, Niihama (JP); Teruo Komori, Niihama (JP); Masaharu Mori, Mitoyo (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 13/637,899

(22) PCT Filed: Mar. 29, 2011

(86) PCT No.: PCT/JP2011/057875
§ 371 (c)(1),
(2), (4) Date: Sep. 27, 2012

(87) PCT Pub. No.: WO2011/122636
PCT Pub. Date: Oct. 6, 2011

(65) Prior Publication Data
US 2013/0022697 A1 Jan. 24, 2013

(30) Foreign Application Priority Data
Mar. 30, 2010 (JP) ................................ P2010-078045

(51) Int. Cl.
*B29C 70/76* (2006.01)
*B28B 11/00* (2006.01)

(52) U.S. Cl.
CPC .................................... *B28B 11/007* (2013.01)
USPC ........................................... 425/110; 425/389

(58) Field of Classification Search
CPC ..................................................... B29C 70/766
USPC .................................. 425/110, 117, 127, 389
See application file for complete search history.

(56) References Cited

U.S. PATENT DOCUMENTS 4,293,357 A 10/1981 Higuchi et al.
4,557,682 A * 12/1985 Montierth ..................... 425/121
5,021,204 A * 6/1991 Frost et al. .................... 264/630
2005/0221014 A1 10/2005 Nate et al.
2006/0131782 A1* 6/2006 Mudd et al. ................... 264/259
2007/0199643 A1* 8/2007 Kawai et al. ............... 156/89.22
2008/0128082 A1 6/2008 Masuda et al.
2013/0036612 A1 2/2013 Uoe et al.
2013/0300030 A1* 11/2013 Mori et al. .................... 264/269

FOREIGN PATENT DOCUMENTS

EP 1952974 A2 8/2008
JP 63-24731 B2 1/1982
JP 63-024731 A 2/1988
JP 2004-25098 A 1/2004
JP 2009-190364 A 8/2009

(Continued)

OTHER PUBLICATIONS

Extended European Search Report issued Aug. 7, 2013 in European Patent Application No. EP 11762860.2.

(Continued)

*Primary Examiner* — Robert B Davis
(74) *Attorney, Agent, or Firm* — Sughrue Mion, PLLC

(57) ABSTRACT

A plugging device 100 including a main body portion 10 having a depressed portion 10*d* and a communication path 10*e* opening into an inner surface 10*c* of the depressed portion 10*d*; an elastic plate 20 fixed to the main body portion 10 so as to cover the depressed portion 10*d*; and a pump 50 connected to the communication path 10*e*.

5 Claims, 8 Drawing Sheets

(a)

(b)

(56) References Cited

FOREIGN PATENT DOCUMENTS

| | | | |
|---|---|---|---|
| JP | 2011-073161 | A | 4/2011 |
| JP | 2011-212851 | A | 10/2011 |
| WO | 2011/122635 | A1 | 10/2011 |

OTHER PUBLICATIONS

International Preliminary Report on Patentability dated Nov. 13, 2012, issued in PCT/JP2011/057875.

Office Action issued Mar. 4, 2014 in counterpart European Patent Application No. 11 762 860.2.

* cited by examiner (a)

(b)

SEALING DEVICE

CROSS REFERENCE TO RELATED APPLICATIONS

This application is a National Stage of International Application No. PCT/JP2011/057875, filed on Mar. 29, 2011, which claims priority from Japanese Patent Application No. 2010-078045, filed on Mar. 30, 2010, the contents of all of which are incorporated herein by reference in their entirety.

TECHNICAL FIELD

The present invention relates to a plugging device.

BACKGROUND ART

Conventionally, honeycomb filter-structured objects have been widely known for use in DPFs (Diesel particulate filters) and the like. This honeycomb filter-structured object has a structure in which one end side of a part of the through holes of a honeycomb-structured object having a large number of through holes is plugged with a plugging material, and the other end side of the remaining through holes is plugged with the plugging material. In Patent Literature 1, a method for manufacturing such a honeycomb filter-structured object is disclosed. In Patent Literature 1, by pressing a plugging material against one end of a honeycomb-structured object 1 arranged in a cylinder 7 by a piston 8, the plugging material is supplied to ends of the through holes of the honeycomb-structured object.

CITATION LIST

Patent Literature

Patent Literature 1: Japanese Examined Patent Publication No. 63-24731

SUMMARY OF INVENTION

Technical Problem

However, in the conventional method, it is difficult to pull the piston away from the honeycomb-structured object after plugging one end side of the honeycomb-structured object with the plugging material, and production efficiency has decreased.

The present invention has been made in view of the above problems, and it is an object of the present invention to provide a plugging device that is excellent in production efficiency.

Solution to Problem

The plugging device according to the present invention is a plugging device including a main body portion having a depressed portion and a communication path opening into an inner surface of the depressed portion; an elastic plate fixed to the main body portion so as to cover the depressed portion; and a pump connected to the communication path.

According to the present invention, a plugging material can be supplied to the through holes of a honeycomb-structured object by the following procedure. First, by discharging a fluid in the depressed portion of the main body portion by the pump, the elastic plate is deformed along the depressed portion of the main body portion to form the depressed portion of the elastic plate. Next, a plugging material is supplied into the depressed portion of the elastic plate, and a honeycomb-structured object is further held on the depressed portion. Next, by supplying the fluid into the depressed portion of the main body portion by the pump, the deformed elastic plate is pressed toward the honeycomb-structured object to eliminate the deformation of the elastic plate. Thus, the plugging material in the depressed portion of the elastic plate is supplied into the through holes of the honeycomb-structured object.

Next, by further supplying the fluid into the depressed portion of the main body portion by the pump, a portion in the elastic plate opposed to the one end of the honeycomb-structured object deforms in the form of a raised portion in a direction opposite to the depressed portion of the main body portion. Thus, the peripheral portion of the portion in the elastic plate opposed to the one end surface of the honeycomb-structured object and the one end surface are pulled away from each other, and therefore, the honeycomb-structured object can be easily pulled away from the main body portion.

Here, it is preferable that the elastic plate is a rubber plate. Thus, the deformation of the elastic plate can be easily performed.

In addition, it is preferable to further include a mask arranged on the elastic plate and having a plurality of through holes.

Thus, it is easy to supply the plugging material to the desired group of through holes of the honeycomb-structured object.

In addition, it is preferable to further include a holding portion switching between a state in which the honeycomb-structured object is fixed to the main body portion on the elastic plate and a state in which the honeycomb-structured object can be moved in a direction away from the main body portion.

Thus, the honeycomb-structured object can be prevented from moving when the plugging material is supplied into the through holes by the elastic plate, and supply can be performed well.

Advantageous Effects of Invention

According to the present invention, a plugging device that is excellent in production efficiency is provided.

DESCRIPTION OF EMBODIMENTS

Preferred embodiments of a plugging device according to the present invention will be described with reference to the drawings. In description, like numerals are used for like elements or elements having like functions, and redundant description is omitted.

Figure 1:
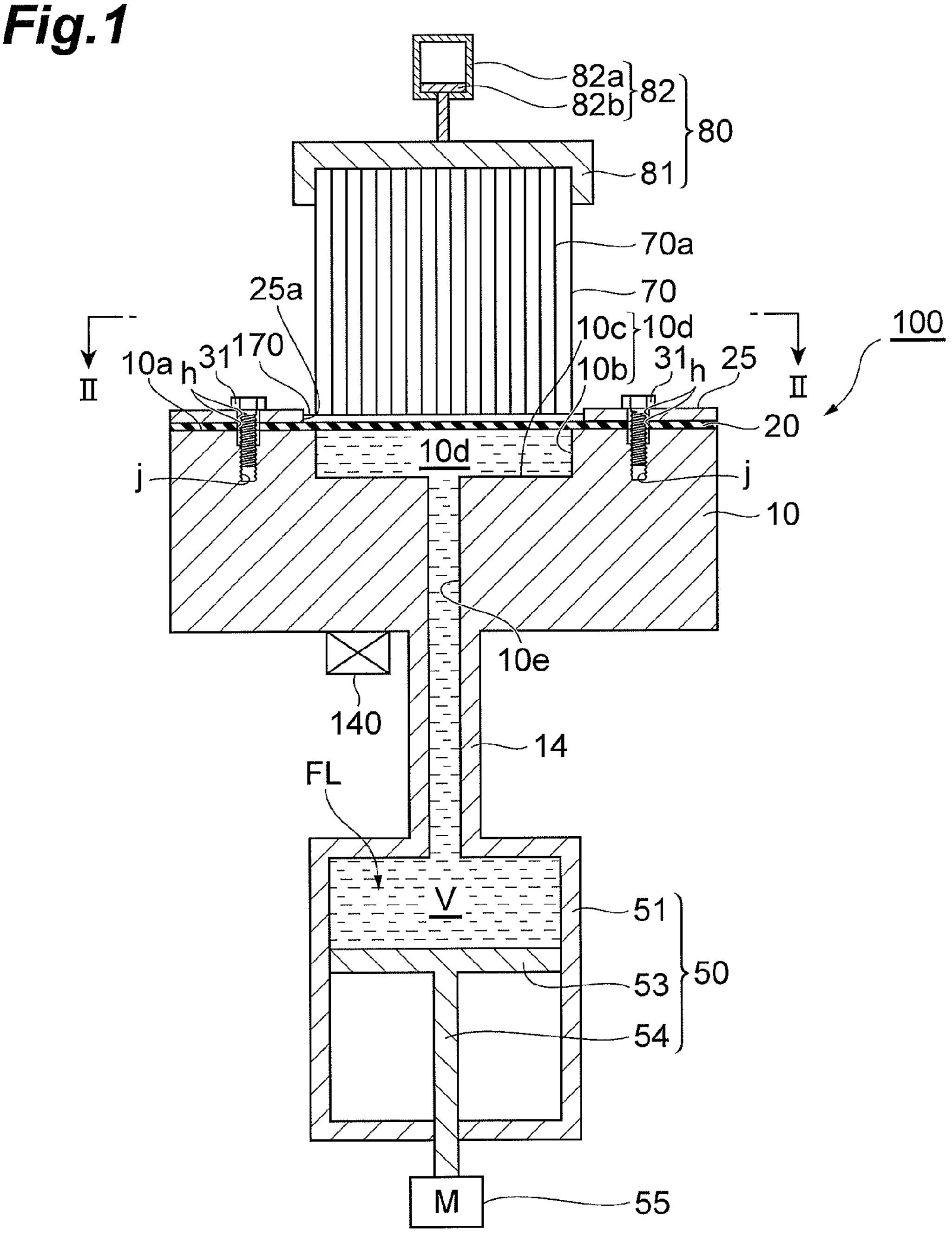
FIG. 1 is a schematic cross-sectional view of a plugging device according to an embodiment of the present invention.

FIG. 1 is a schematic cross-sectional view of a plugging device 100 according to an example in this embodiment. The plugging device 100 according to this embodiment mainly includes a main body portion 10, an elastic plate 20, a pump 50, and a holding portion 80.

Figure 2:
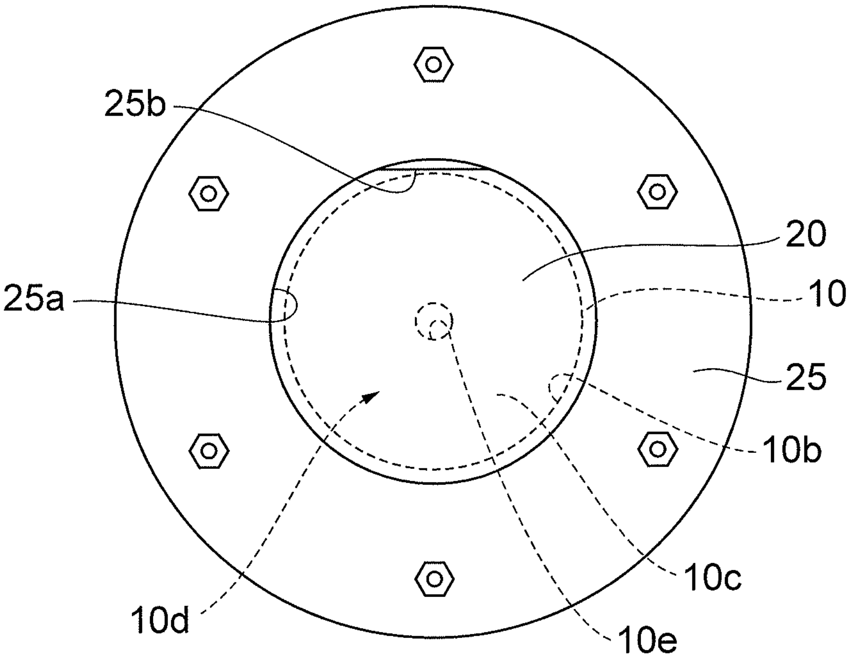
FIG. 2 is an arrow view II-II of the plugging device in FIG. 1.

The main body portion 10 is formed of a rigid material. Examples of the rigid material include metals, such as stainless steel, and polymer materials, such as fiber-reinforced plastics. A depressed portion 10*d* is formed on the upper surface 10*a* of the main body portion 10. In this embodiment, the shape of the depressed portion 10*d* is made a cylindrical shape, as shown in FIG. 1 and FIG. 2. The side surface 10*b* and bottom surface 10*c* of the depressed portion 10*d* are made perpendicular and parallel to the upper surface 10*a* of the main body portion 10, respectively. The diameter of the depressed portion 10*d* can be, for example, 100 to 320 mm. The depth of the depressed portion 10*d* can be, for example, 0.2 to 20 mm.

The elastic plate 20 is arranged on the upper surface 10*a* of the main body portion 10 so as to cover the open surface of the depressed portion 10*d*. The elastic plate 20 has elasticity and can be easily deformed. As the elastic plate 20, a rubber plate is preferable. Examples of the rubber include natural rubbers and synthetic rubbers, such as styrene butadiene rubbers, butadiene rubbers, butyl rubbers, ethylene propylene rubbers, nitrile rubbers, chloroprene rubbers, fluororubbers, silicone rubbers, and urethane rubbers. The thickness of the elastic plate 20 is not particularly limited, and can be, for example, 0.3 to 3.0 mm.

The elastic plate 20 is fixed to the main body portion 10 by a ring member 25 and bolts 31. The ring member 25 has an opening 25*a* at a position corresponding to the depressed portion 10*d* of the main body portion 10 and thus forms a ring shape. The ring member 25 is arranged on the elastic plate 20 so that a central portion (a portion opposed to the depressed portion 10*d*) in the elastic plate 20 is exposed. Thus, the peripheral portion of the elastic plate 20 is sandwiched between the main body portion 10 and the ring member 25. Through holes h are formed both in the ring member 25 and the elastic plate 20, and threaded holes j corresponding to these through holes h are formed in the main body portion 10, and by the bolts 31 being arranged through these through holes h, screwed into the threaded holes j, and fixed, the peripheral portion of the elastic plate 20 is closely fixed to a portion around the depressed portion 10*d*, in the upper surface 10*a* of the main body portion 10.

It is preferable that the inner diameter of the opening 25*a* of the ring member 25 is made larger than the inner diameter of the depressed portion 10*d* of the main body portion 10, as shown in FIG. 1 and FIG. 2.

The main body portion 10 further has a communication path 10*e* that opens into the bottom surface 10*c* of the depressed portion 10*d*. In this embodiment, the communication path 10*e* opens into the bottom surface 10*c* of the depressed portion 10*d*, but the communication path 10*e* need only open into the inner surface of the depressed portion 10*d*, and may open, for example, into the side surface 10*b* of the depressed portion 10*d*. In addition, the shape and number of the opening of the communication path 10*e* are also not particularly limited.

The pump 50 is connected to the communication path 10*e* via a connection pipe 14.

The pump 50 includes a cylinder 51, a piston 53 arranged in the cylinder 51, and a piston rod 54 connected to the piston 53. A motor 55 that axially reciprocates the piston rod 54 is connected to the piston rod 54. The piston rod 54 may be manually moved.

In this embodiment, a closed space V formed by the main body portion 10, the connection pipe 14, and the cylinder 51 is formed between the elastic plate 20 and the piston 53, and a fluid FL is filled in the closed space V. The fluid FL is not particularly limited, but liquids are preferable, and particularly, spindle oil and the like are preferable. By moving the piston 53, the fluid FL can be discharged from the depressed portion 10*d* of the main body portion 10, and the fluid FL can be supplied into the depressed portion 10*d*. In addition, it is also preferable that the fluid FL is gas, such as air.

The holding portion 80 is provided on the main body portion 10. The holding portion 80 has a holder 81 that holds a honeycomb-structured object 70, and a pneumatic cylinder 82 to which the holder 81 is connected.

The holder 81 holds the honeycomb-structured object 70 so that one side open surfaces of through holes 70*a* are opposed to the elastic plate 20 and the depressed portion 10*d*, as shown in FIG. 1.

The pneumatic cylinder 82 has a cylinder 82*a* extending in a vertical direction, and a piston 82*b* provided in the cylinder 82*a*, and by adjusting externally supplied pressure, pressure on both upper and lower sides of the piston 82*b* can be adjusted. Thus, the pneumatic cylinder 82 can move the holder 81 in a direction in which the honeycomb-structured object 70 and the elastic plate 20 approach each other and in a direction in which these go away from each other. In addition, by pressing the holder 81 downward by a predetermined force according to the supply pressure of gas in front of and behind the piston 82*b*, the pneumatic cylinder 82 can bring the honeycomb-structured object 70 into close contact with a mask 170 described later. Further, by releasing pressure in front of and behind the piston, the pneumatic cylinder 82 can also allow the holder 81 to move freely in the vertical direction. In other words, the holding portion 80 can switch between a state in which the honeycomb-structured object 70 that the holder 81 holds can be freely moved in an upper direction and a state in which the honeycomb-structured object 70 is fixed to the main body portion 10.

Figure 3:
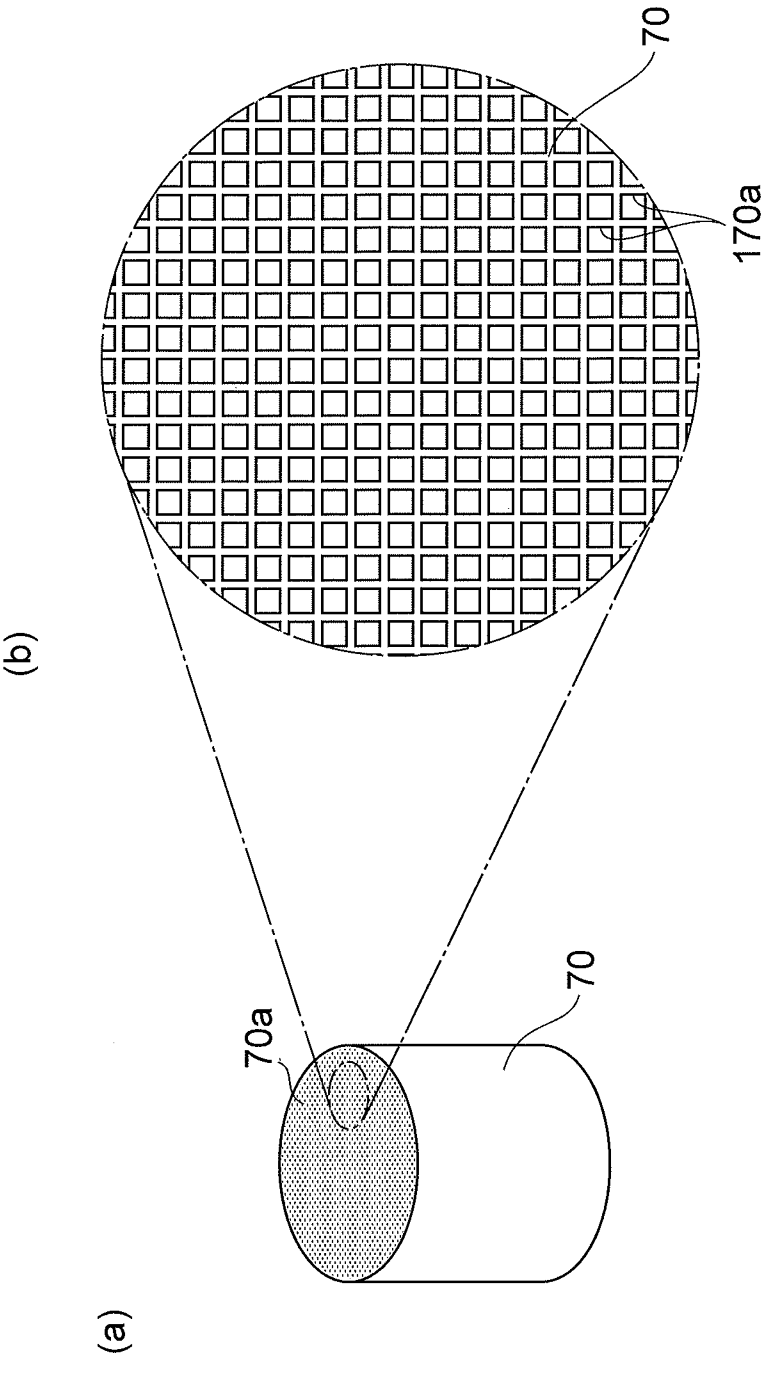
FIG. 3(*a*) is a perspective view of a honeycomb-structured object used in the plugging device in FIG. 1, and FIG. 3(*b*) is partially enlarged view of FIG. 3(*a*).

One example of the honeycomb-structured object 70 used in this embodiment is a cylinder in which a large number of through holes 70*a* are arranged generally parallel, as shown in FIG. 3(*a*). The cross-sectional shape of the through hole 70*a* is a square as shown in FIG. 3(*b*). These plurality of through holes 70*a* are arranged in squares in the honeycomb-structured object 70 as seen from an end surface, that is, they are arranged so that the central axes of the through holes 70*a* are positioned at the vertexes of squares, respectively. The size of the square of the cross section of the through hole 70*a* can be, for example, one side of 0.8 to 2.5 mm.

In addition, the length of the honeycomb-structured object 70 in a direction in which the through holes 70*a* extend is not particularly limited, and can be, for example, 40 to 350 mm. In addition, the outer diameter of the honeycomb-structured object 70 is also not particularly limited, and can be, for example, 100 to 320 mm.

The material of the honeycomb-structured object 70 is not particularly limited, and ceramic materials are preferable in terms of high temperature resistance. Examples of the material include oxides, such as alumina, silica, mullite, cordierite, glass, and aluminum titanate, silicon carbide, silicon nitride, and metals. Aluminum titanate can further contain magnesium and/or silicon. Such a honeycomb-structured object 70 is usually porous.

In addition, the honeycomb-structured object 70 may be a green molded body (unfired molded body) that becomes the ceramic material as described above by subsequently firing it. The green molded body contains an inorganic compound source powder that is a ceramic raw material, and an organic binder, such as methyl cellulose, and additives added as required.

For example, in the case of a green molded body of aluminum titanate, the inorganic compound source powder can contain an aluminum source powder, such as an α-alumina powder, and a titanium source powder, such as an anatase type or rutile type titania powder, and can further contain a magnesium source powder, such as a magnesia powder or a magnesia spinel powder, and/or a silicon source powder, such as a silicon oxide powder or a glass fit, as required.

Examples of the organic binder include celluloses, such as methyl cellulose, carboxylmethyl cellulose, hydroxyalkylmethyl cellulose, and sodium carboxylmethyl cellulose; alcohols, such as polyvinyl alcohol; and lignin sulfonate.

Examples of the additives include a pore-forming agent, a lubricant and a plasticizer, a dispersing agent, and a solvent.

Examples of the pore-forming agent include carbon materials, such as graphite; resins, such as polyethylene, polypropylene, and polymethyl methacrylate; plant materials, such as starch, nutshells, walnut shells, and corn; ice; and dry ice.

Examples of the lubricant and the plasticizer include alcohols, such as glycerin; higher fatty acids, such as caprylic acid, lauric acid, palmitic acid, arachidic acid, oleic acid, and stearic acid; metal stearates, such as aluminum stearate; and polyoxyalkylene alkyl ether.

Examples of the dispersing agent include inorganic acids, such as nitric acid, hydrochloric acid, and sulfuric acid; organic acids, such as oxalic acid, citric acid, acetic acid, malic acid, and lactic acid; alcohols, such as methanol, ethanol, and propanol; and surfactants, such as ammonium polycarboxylate.

As the solvent, for example, alcohols, such as methanol, ethanol, butanol, and propanol; glycols, such as propylene glycol, polypropylene glycol, and ethylene glycol; and water can be used.

The mask 170 is arranged in the opening 25*a* of the ring member 25 on the elastic plate 20. The material of the mask 170 is not particularly limited, and examples of the material include metals and resins.

Figure 4:
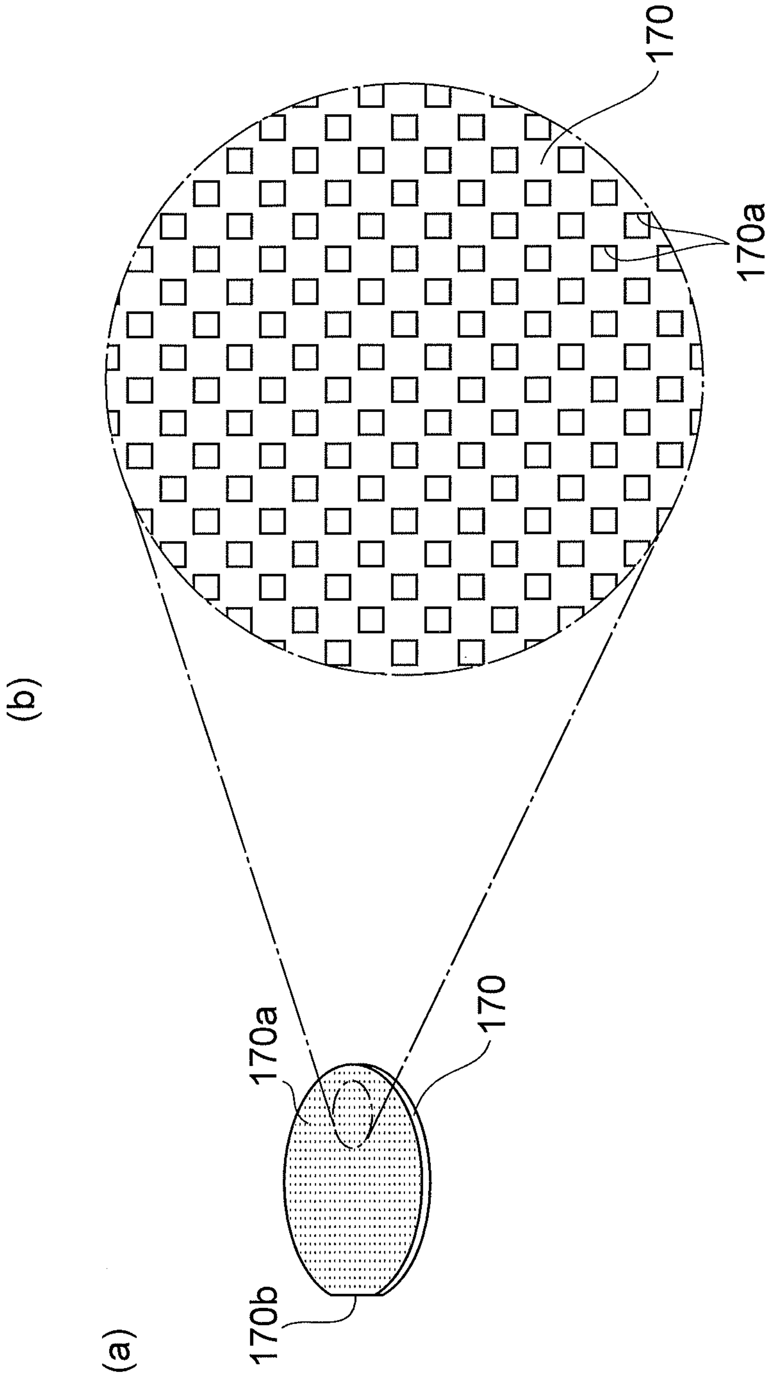
FIG. 4(*a*) is a perspective view of a mask in FIG. 1, and FIG. 4(*b*) is partially enlarged view of FIG. 4(*a*).

One example of the mask 170 used in this embodiment is shown in FIG. 4(*a*). The mask 170 is a circular, plate-like member and has a large number of through holes 170*a* extending in a thickness direction. The cross-sectional shape of the through hole 170*a* is a square corresponding to the through hole 70*a* of the honeycomb-structured object 70 (see FIG. 3(*b*)), as shown in FIG. 4(*b*). These plurality of through holes 170*a* are arranged staggered, as shown in FIG. 4(*b*), and the through holes 170*a* are arranged opposed to only a plurality of through holes 70 in the relationship of not being adjacent to each other at the top, bottom, left, and right, among the plurality of through holes 70*a* arranged in squares in FIG. 3(*b*). In order to make the positioning of the through holes 170*a* of the mask 170 easy, an orientation flat 170*b* is formed on the mask 170, and a protrusion 25*b* corresponding to the orientation flat may also be provided on the ring member 25 correspondingly. It is preferable that the outer diameter of the mask 170 is made larger than the inner diameter of the depressed portion 10*d* of the main body portion 10, as shown in FIG. 1.

It is preferable that a vibrator 140, such as an ultrasonic vibrator, is provided on the main body portion 10.

(Method for Use)

Next, a method for using the above-described plugging device 100 will be described. First, from a state in FIG. 1, the pneumatic cylinder 82 is previously driven to pull up upward the holder 81 that holds the honeycomb-structured object 70, and remove the mask 170 from the elastic plate 20. Next, by pulling the piston 53 of the pump 50 downward, the fluid FL is discharged downward from the depressed portion 10*d* of the main body portion 10. Thus, the elastic plate 20 deforms and comes into close contact with the side surface 10*b* and the bottom surface 10*c* of the depressed portion 10*d*, as shown in FIG. 5(*a*), and thus, the depressed portion 20*d* of the elastic plate 20 is formed.

Figure 5:
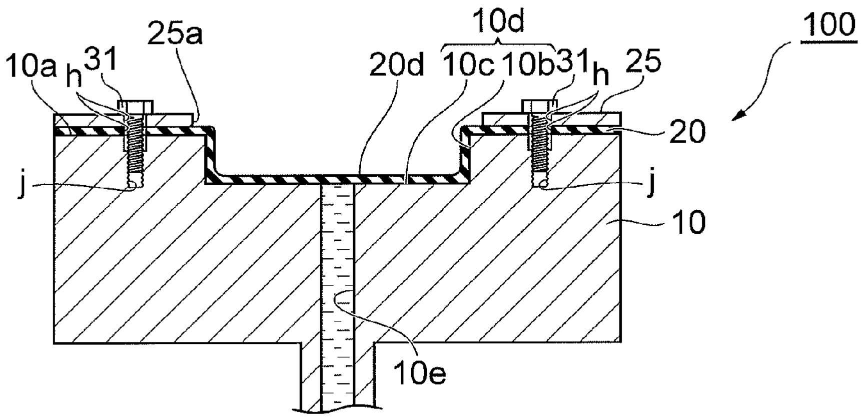
FIG. 5(*a*) is a partial cross-sectional view for explaining the operation of the plugging device in FIG. 1, and FIG. 5(*b*) is a partial cross-sectional view following FIG. 5(*a*).
Figure 5:
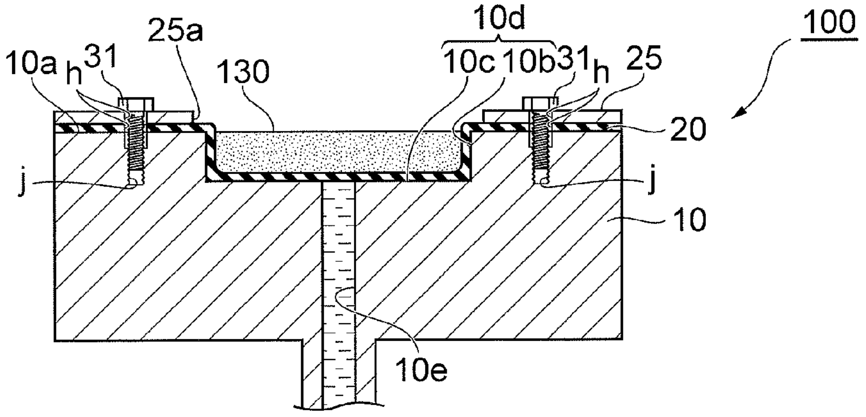

Next, a plugging material 130 is supplied into the depressed portion 20*d* of the elastic plate 20, as shown in FIG. 5(*b*). The flattening of the surface of and defoaming of the plugging material 130 is promoted by driving the vibrator 140, as required.

(Plugging Material)

The plugging material 130 is not particularly limited as long as it can close ends of the through holes 70*a* of the honeycomb-structured object 70, but it is preferable that the plugging material 130 is liquid. Examples of the plugging material include a slurry containing a ceramic material or a ceramic raw material, a binder, and a solvent.

Examples of the ceramic material include the constituent materials for the honeycomb-structured object described above and their raw materials.

Examples of the binder include organic binders, such as celluloses, such as methyl cellulose, carboxylmethyl cellulose, hydroxyalkylmethyl cellulose, and sodium carboxylmethyl cellulose; alcohols, such as polyvinyl alcohol; and lignin sulfonate.

The use amount of the binder can be, for example, 3 to 5000 mL.

As the solvent, for example, monohydric alcohols, such as methanol, ethanol, butanol, and propanol; glycols, such as propylene glycol, polypropylene glycol, and ethylene glycol; and water can be used. Among them, water is preferable, and ion-exchange water is more preferably used in that the amount of impurities is small.

The use amount of the solvent can be 15 to 40% by weight.

Figure 6:
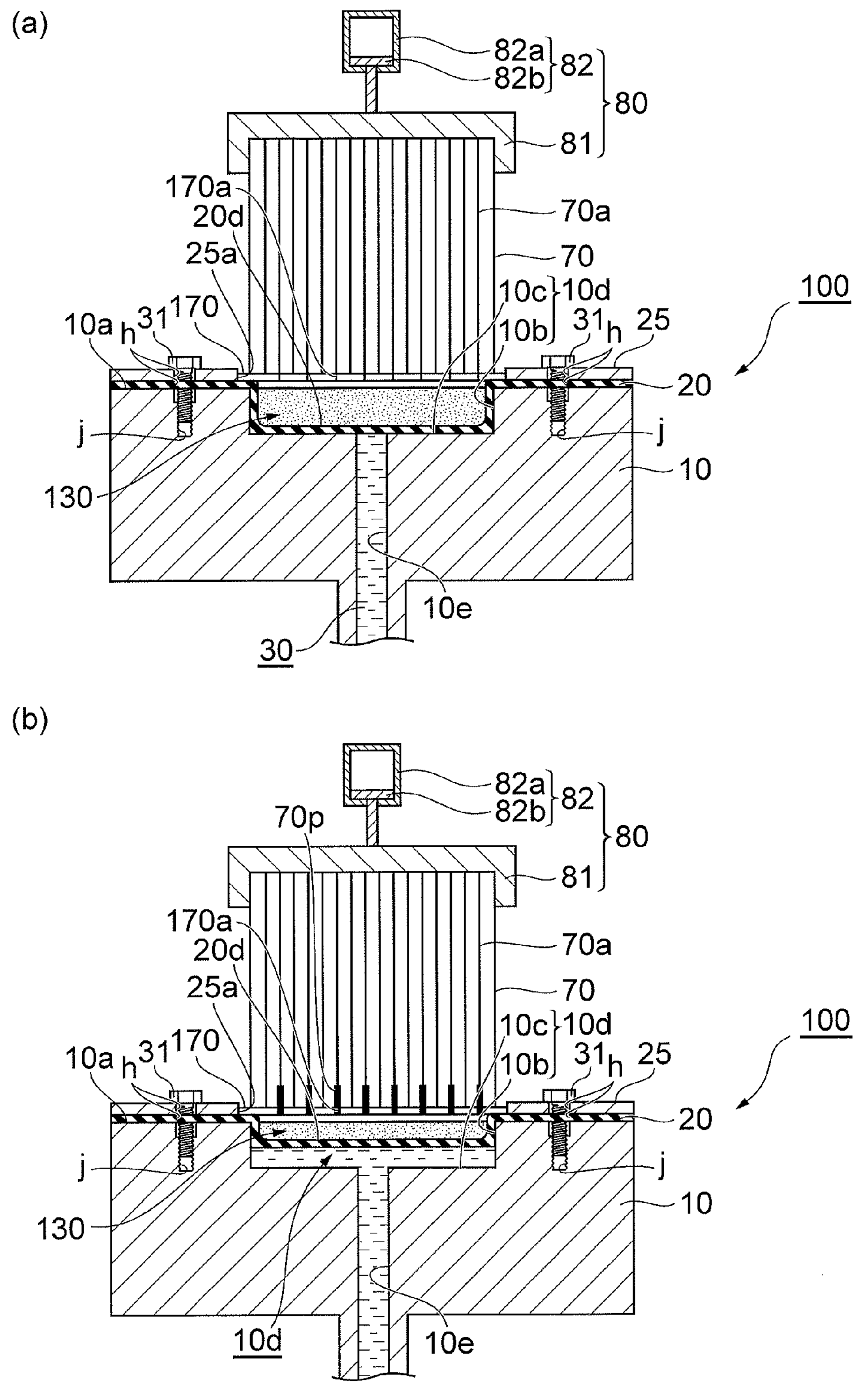
FIG. 6(*a*) is a partial cross-sectional view following FIG. 5(*b*), and FIG. 6(*b*) is a partial cross-sectional view following FIG. 6(*a*).

Next, as shown in FIG. 6(*a*), the mask 170 is set on the elastic plate 20 so as to cover the depressed portion 10*d* of the main body portion 10, and then, by moving the holder 81 downward by the pneumatic cylinder 82 to bring the honeycomb-structured object 70 into contact with the mask 170, a part of the through holes 70*a* of the honeycomb-structured object 70, and the through holes 170*a* of the mask 170 are allowed to communicate with each other, and further, the holder 81 is pressed downward by the pneumatic cylinder 82 to fix the honeycomb-structured object 70 to the mask 170 and the main body portion 10 so that the lower end surface (one end surface) of the honeycomb-structured object 70 is opposed to the depressed portion 20*d* of the elastic plate 20 via the mask 170.

Figure 7:
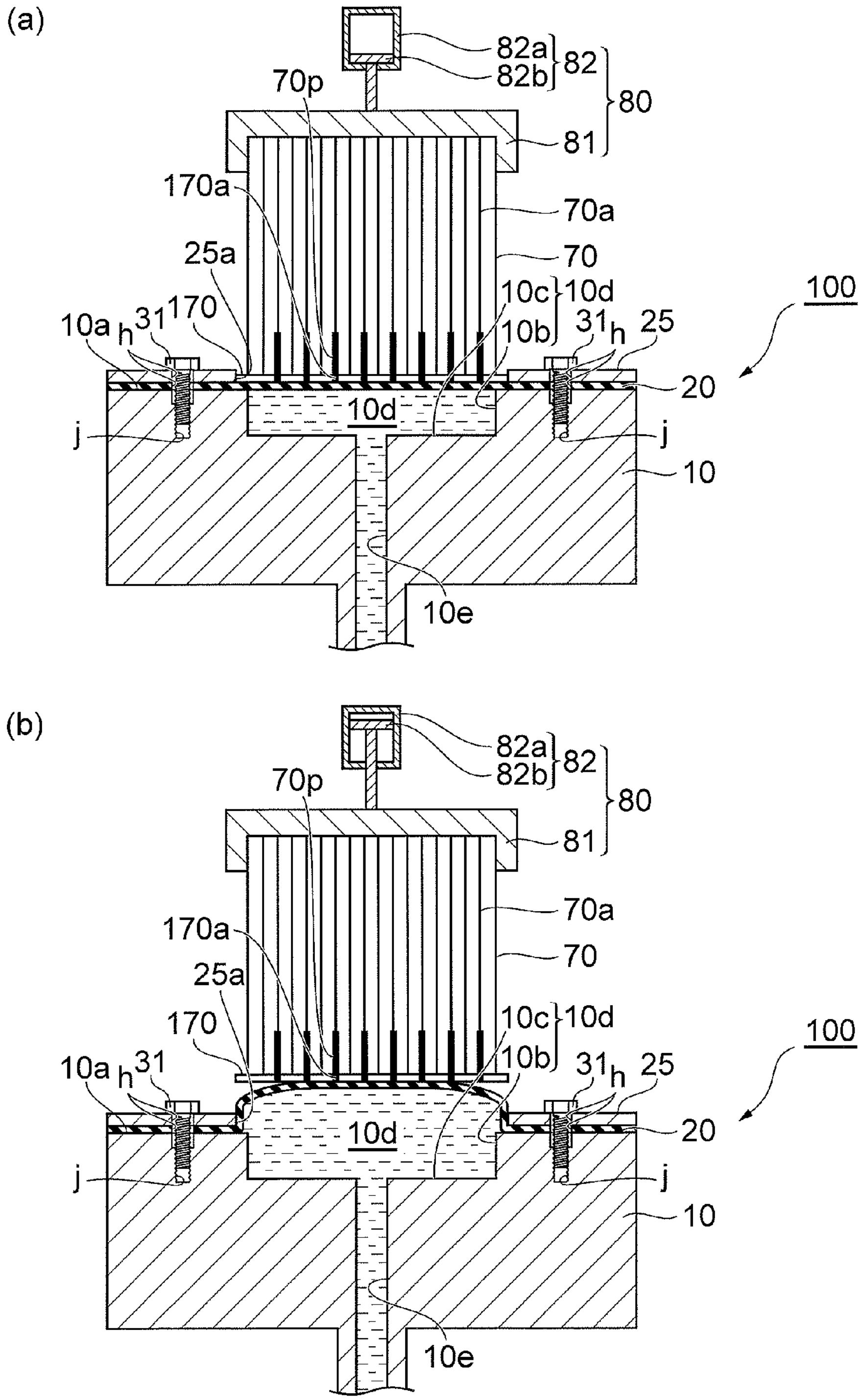
FIG. 7(*a*) is a partial cross-sectional view following FIG. 6(*b*), and FIG. 7(*b*) is a partial cross-sectional view following FIG. 7(*a*).

Then, by moving the piston of the pump 50 upward, the fluid FL is supplied into the depressed portion 10*d*, and thus, the elastic plate 20 moves toward the mask 170, as shown in FIG. 6(*b*). This step is performed until the elastic plate 20 comes into contact with the mask 170, and the deformation of the elastic plate 20 is eliminated, that is, the depressed portion 20*d* of the elastic plate 20 is eliminated, as shown in FIG. 7(*a*).

Thus, the plugging material 130 is supplied into the part of the through holes 70*a* of the honeycomb-structured object 70 via the through holes 170*a* of the mask 170, and plugging portions 70*p* are formed.

Next, the pressing of the honeycomb-structured object 70 in a lower direction by the pneumatic cylinder 82 is stopped so that the honeycomb-structured object 70 can move freely upward, and then, the piston 53 is further raised to further supply the fluid FL between the elastic plate 20 and the main body portion 10. Thus, as shown in FIG. 7(*b*), a portion in the elastic plate 20 opposed to the one end surface of the honeycomb-structured object deforms in the form of a raised portion in an upper direction, and thus, the mask 170 and the honeycomb-structured object 70 move upward. At this time, the mask 170 goes away from the peripheral portion (the other part) of the elastic plate 20 deforming in the form of a raised portion, and thus, the mask 170 and the honeycomb-structured object 70 can be easily pulled away from the main body portion 10.

Figure 8:
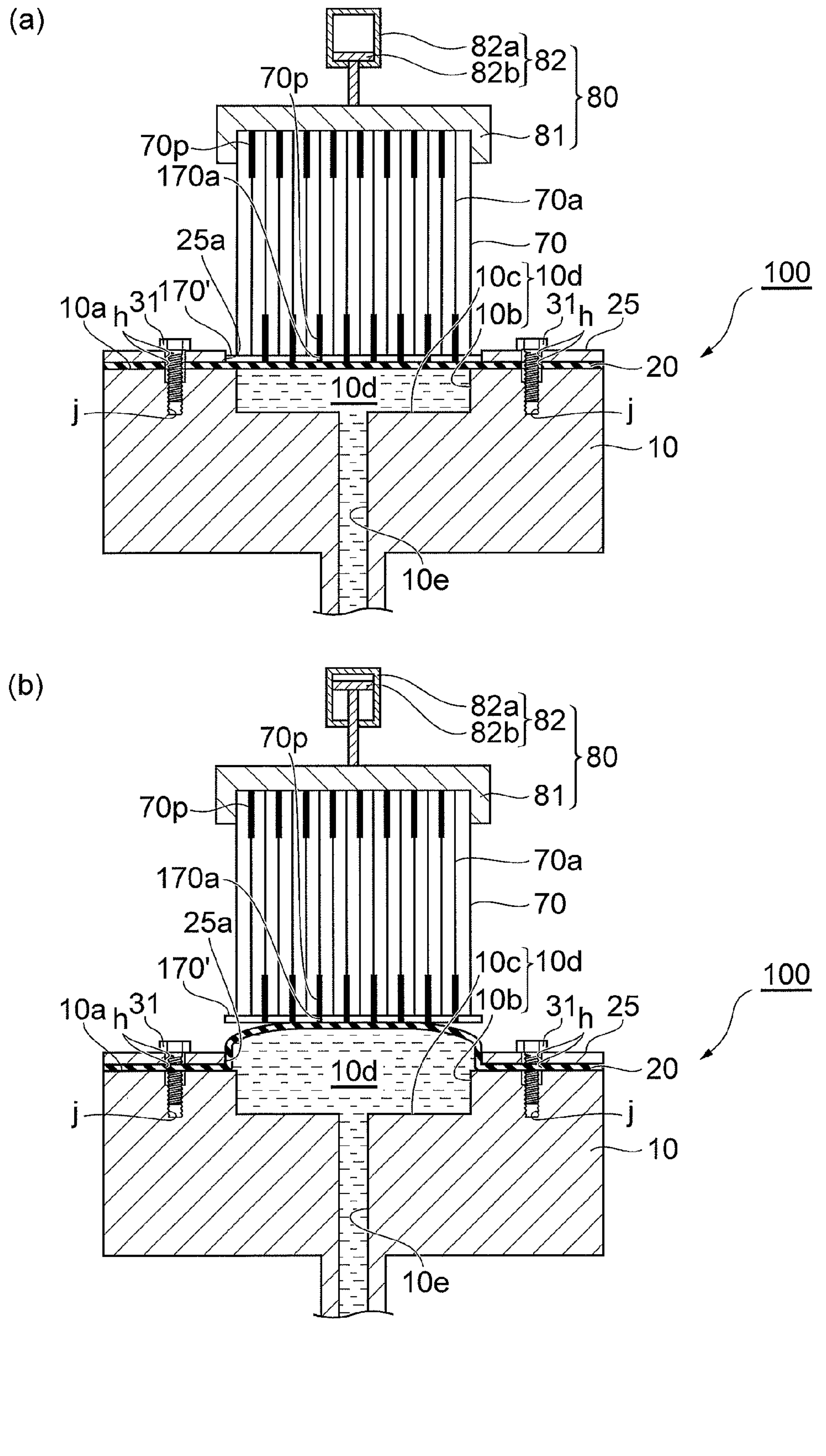
FIG. 8(*a*) is a partial cross-sectional view following FIG. 7(*b*), and FIG. 8(*b*) is a partial cross-sectional view following FIG. 7(*a*).

Next, after the honeycomb-structured object 70 is removed from the holder 81, the honeycomb-structured object 70 is turned upside down, and then, the honeycomb-structured object 70 is held by the holder 81 again. Then, using a mask 170' with staggered arrangement in which the arrangement of the through holes 170*a* is diametrically opposite to that of the mask 170, similar operations are performed. Thus, the other end side of the remaining through holes 70*a* is plugged with the plugging material, and plugging portions 70*p* are formed, as shown in FIG. 8(*a*). Next, by deforming the portion in the elastic plate 20 opposed to the one end surface of the honeycomb-structured object in the form of a raised portion upward as in the above, the mask 170' and the honeycomb-structured object 70 can be easily pulled away from the main body portion 10 and the elastic plate 20.

Then, by drying and firing the honeycomb-structured object 70 in which both ends of the through holes 70*a* are plugged in this manner, and so on, a honeycomb filter-structured object can be manufactured.

According to the present invention, a portion in the elastic plate 200 opposed to the one end surface of the honeycomb-structured object can be deformed in the form of a raised portion, and thus, the mask 170 in contact with the honeycomb-structured object 70 after the plugging material 130 is supplied can be easily pulled away from the main body portion 10 and the elastic plate 20. Therefore, production efficiency can be increased, and a plugged honeycomb-structured object can be manufactured at reduced cost.

In addition, by using the elastic plate 20, there is a tendency that during plugging, pressure is easily equally applied to the plugging material, and the plugging material tends to be easily equally supplied to the plurality of through holes.

The present invention is not limited to the above embodiments, and various modifications can be made.

For example, in the above embodiment, the elastic plate 20 is fixed to the main body portion 10 by the ring member 25 and the bolts 31, but a fixing method is not particularly limited. For example, the elastic plate 20 may be fixed to the upper surface 10*a* of the main body portion 10 by an adhesive.

In addition, in the above, the communication path 10*e* is formed by the main body portion 10 and the connection pipe 14, but the pump 50 may be directly connected to the main body portion 10 without the connection pipe 14.

In addition, in the above embodiment, a piston pump including the cylinder 51, the piston 53, and the piston rod 54 is used as the pump 50, but the pump 50 is not particularly limited as long as it can supply and discharge a fluid.

In addition, the shape of the depressed portion 10*d* is not particularly limited and can be appropriately set according to the honeycomb-structured object 70 to be plugged.

For example, the planar shape of the depressed portion 10*d* as seen from above can also be an ellipse, a rectangle, a square, or the like other than a circle. In this case, a size in the case of a rectangle or a square can be, for example, one side of 50 to 300 mm. In addition, the side surface 10*b* and the bottom surface 10*c* need not be perpendicular and parallel to the upper surface 10*a* of the main body portion 10, respectively, and may each be, for example, an inclined surface or a curved surface.

In addition, in the above embodiment, the holding portion 80 includes the pneumatic cylinder 82, but this is not limiting, and the pneumatic cylinder 82 can be replaced by various mechanisms, for example, gear mechanisms.

In addition, the holding portion 80 is not necessarily essential. For example, it is possible to fix the honeycomb-structured object to the main body portion 10 by placing a weight on the honeycomb-structured object 70, when supplying the plugging material, and remove the weight to make the honeycomb-structured object movable, when moving the honeycomb-structured object 70 away from the main body portion. In addition, when the honeycomb-structured object has some weight, a mode without special fixing means is also possible because the honeycomb-structured object is fixed by self-weight.

The shape and structure of the honeycomb-structured object 70 are also not limited to the above. For example, the outer shape of the honeycomb-structured object 70 may not be a cylinder and may be, for example, a prism, such as a quadrangular prism. In addition, the cross-sectional shape of the through hole 70*a* of the honeycomb-structured object 70 may not be a square and may be, for example, a rectangle, a triangle, a polygon, or a circle. Further, the arrangement of the through holes 70*a* may not be square arrangement and may be, for example, triangular arrangement, or staggered arrangement. In addition, in this case, the shape and arrangement of the through holes of the mask can also be appropriately changed according to the shape and arrangement of the through holes 70*a* of the honeycomb-structured object 70.

In addition, in the above embodiment, the plate-like mask 170 having a large number of through holes is used, and a place shielded by the mask is also arbitrary. Further, it is possible to carry out even without using such a mask 170. For example, a material that decomposes on heating is plugged into a part of the through holes 70*a* of the honeycomb-structured object 70 before plugging treatment, and the plugs need only be pyrolyzed or the like after plugging. In the present invention, there is an effect that even when no mask is used, the honeycomb-structured object 70 can be easily pulled away from the main body portion 10 or the elastic plate 20 by the elastic plate 20 to be deformed in the form of a raised portion after plugging treatment.

REFERENCE SIGNS LIST

10 . . . main body portion, 10*e* . . . communicate portion, 20 . . . elastic plate, 30 . . . depressed portion, 50 . . . pump, 70 . . . honeycomb-structured object, 80 . . . holding portion, 100 . . . plugging device, 170 . . . mask.

The invention claimed is:

1. A plugging device comprising:

a main body portion having a depressed portion and a communication path opening into an inner surface of the depressed portion;

an elastic plate fixed to the main body portion so as to cover the depressed portion; and a pump connected to the communication path; wherein the elastic plate is impermeable.

2. The plugging device according to claim 1, wherein the elastic plate is a rubber plate.

3. The plugging device according to claim 1, further comprising a mask arranged on the elastic plate and having a plurality of through holes.

4. The plugging device according to claim 1, further comprising a holding portion switching between a state in which a honeycomb-structured object is fixed to the main body portion on the elastic plate and a state in which the honeycomb-structured object can be moved in a direction away from the main body portion.

5. The plugging device according to claim 3, further comprising a holding portion switching between a state in which a honeycomb-structured object is fixed to the main body portion on the elastic plate and a state in which the honeycomb-structured object can be moved in a direction away from the main body portion.

* * * * *